US009435226B2

(12) United States Patent
Tanaka

(10) Patent No.: US 9,435,226 B2
(45) Date of Patent: Sep. 6, 2016

(54) GAS TURBINE AND REPAIRING METHOD OF GAS TURBINE

(75) Inventor: Yoichi Tanaka, Takasago (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 850 days.

(21) Appl. No.: 13/523,127

(22) Filed: Jun. 14, 2012

(65) Prior Publication Data

US 2012/0328423 A1 Dec. 27, 2012

(30) Foreign Application Priority Data

Jun. 20, 2011 (JP) ................................ 2011-136446

(51) Int. Cl.
| F01D 25/24 | (2006.01) |
| F01D 5/00 | (2006.01) |
| F01D 5/08 | (2006.01) |
| F02C 7/28 | (2006.01) |
| F01D 9/04 | (2006.01) |
| F01D 11/08 | (2006.01) |

(52) U.S. Cl.
CPC ............. *F01D 25/246* (2013.01); *F01D 5/005* (2013.01); *F01D 5/08* (2013.01); *F02C 7/28* (2013.01); *F05D 2230/70* (2013.01); *F05D 2230/80* (2013.01); *F05D 2230/90* (2013.01); *F05D 2240/11* (2013.01); *F05D 2250/314* (2013.01); *Y02T 50/676* (2013.01); *Y10T 29/49233* (2015.01)

(58) Field of Classification Search
CPC ........ F01D 9/04; F01D 11/08; F01D 25/243; F05D 2230/80; F05D 2230/90; F05D 2240/11; F05D 2240/14; F05D 2250/314
See application file for complete search history.

(56) References Cited

U.S. PATENT DOCUMENTS 3,841,787 A * 10/1974 Scalzo .......................... 415/136
3,892,497 A 7/1975 Gunderlock et al.
(Continued)

FOREIGN PATENT DOCUMENTS

CN 1683766 A 10/2005
CN 101046161 A 10/2007
(Continued)

OTHER PUBLICATIONS

Invitation to Pay Additional Fees and, Where Applicable, Protest Fee dated Jul. 17, 2012, for PCT/JP2012/065602 (Form PCT/ISA/206), w/ English translation.
(Continued)

*Primary Examiner* — Nathaniel Wiehe
*Assistant Examiner* — Jason Davis
(74) *Attorney, Agent, or Firm* — Westerman, Hattori, Daniels & Adrian, LLP

(57) ABSTRACT

A gas turbine includes ring segments and isolation rings that surround a channel for high-temperature gas W from an outer peripheral side, blade rings formed in an annular shape on the outer peripheral side of the ring segments and the isolation rings, and supporting members fitted into fitting concave portions recessed from the end faces of the blade rings in the direction of the axis and supporting the ring segments and the isolation rings. An inner wall surface of the fitting concave portion has a first inclined surface that inclines so as to narrow gradually from an opening edge of the fitting concave portion toward the inside of the blade ring in the direction of the axis, and the supporting member has a second inclined surface that inclines so as to correspond to the first inclined surface.

6 Claims, 6 Drawing Sheets

(56) References Cited

U.S. PATENT DOCUMENTS

| | | | |
|---|---|---|---|
| 5,022,816 A | 6/1991 | Maier et al. | |
| 5,127,793 A | 7/1992 | Walker et al. | |
| 5,618,161 A | 4/1997 | Papageorgiou et al. | |
| 6,233,822 B1 * | 5/2001 | Grossklaus et al. | 29/889.1 |
| 7,094,025 B2 | 8/2006 | Arness et al. | |
| 2003/0031557 A1 * | 2/2003 | Arilla et al. | 415/173.1 |
| 2005/0232764 A1 | 10/2005 | Chiu et al. | |
| 2007/0231127 A1 * | 10/2007 | Durand et al. | 415/173.1 |
| 2010/0124492 A1 | 5/2010 | Tucker et al. | |

FOREIGN PATENT DOCUMENTS

| | | | | |
|---|---|---|---|---|
| EP | 1225308 A2 | | 7/2002 | |
| EP | 1323892 A2 | | 7/2003 | |
| EP | 2039882 A2 | * | 3/2009 | F01D 5/00 |
| JP | 50-155819 A | | 12/1975 | |
| JP | 54-77817 A | | 6/1979 | |
| JP | 58-135305 A | | 8/1983 | |
| JP | 62-150010 A | | 7/1987 | |
| JP | 3-151525 A | | 6/1991 | |
| JP | 2000-220471 A | | 8/2000 | |
| JP | 2001-73711 A | | 3/2001 | |
| JP | 2003-222030 A | | 8/2003 | |
| JP | 2005-299666 A | | 10/2005 | |
| JP | 2007-270834 A | | 10/2007 | |
| JP | 2007-270836 A | | 10/2007 | |
| JP | 2008-151007 A | | 7/2008 | |
| JP | 2008-303874 A | | 12/2008 | |
| JP | 2009-200208 A | | 9/2009 | |
| JP | 2010-229925 A | | 10/2010 | |
| JP | 2011-38491 A | | 2/2011 | |

OTHER PUBLICATIONS

International Search Report of PCT/JP2012/065602, date of mailing date Aug. 28, 2012 (Form PCT/ISA/210), w/ English translation.
Written Opinion of PCT/JP2012/065602, date of mailing date Aug. 28, 2012 (Form PCT/ISA/237), w/ English translation.
Extended European Search Report dated Feb. 18, 2015, issued in corresponding European Application No. 12803328.9. (5 pages).
Office Action dated Apr. 22, 2015, issued in counterpart Chinese Patent Application No. 201280028562.6, with English translation (19 pages).
Notice of Allowance dated Apr. 24, 2015, issued in counterpart Japanese Patent Application No. 2011-136446, with English translation (6 pages).

* cited by examiner

PRIOR ART

GAS TURBINE AND REPAIRING METHOD OF GAS TURBINE

Priority is claimed on Japanese Patent Application No. 2011-136446, filed Jun. 20, 2011, the contents of which are incorporated herein by reference.

BACKGROUND OF THE INVENTION

1. Field of the Invention

The present invention relates to a gas turbine in which the turbine is rotated by high-temperature gas produced by mixing and burning compressed air and fuel, to obtain rotative power.

2. Description of Related Art

When comparing gas turbines with other power units that are similar in weight and volume of the unit body, the gas turbines have advantages such as higher output and fast start-up capabilities. Currently, the gas turbines are used in various fields, such as engines of aircrafts or vessels and power generation facilities.

The gas turbines are mainly constituted by a compressor, a combustor, and a turbine, and the turbines are classified into axial-flow turbines and radial-flow turbines according to the difference in the flow direction of high-temperature gas in this turbine.

An example of the gas turbines using the axial-flow turbine is disclosed in Japanese Unexamined Patent Application, First Publication No. 2011-38491. In this axial-flow turbine, blade rings are continuously fixed toward the direction of a rotating shaft so as to form an annular shape on the inner peripheral side of a casing that forms an outline. Additionally, ring segments are supported via isolation rings on the inner peripheral side of this blade ring, the ring segments are arranged in an annular shape with gaps in the direction of the rotating shaft of the axial-flow turbine, and the vanes are fixed in the gaps. Since blades are provided between the vanes in the direction of the rotating shaft, that is, at positions corresponding to the ring segments, the vanes and the blades are alternately arranged in the direction of the rotating shaft.

Moreover, supporting members that connect the ring segments and the isolation rings with the blade rings from the direction of the rotating shaft, and regulate movement of the ring segments and the isolation rings are provided at the end faces of the blade rings in the direction of the rotating shaft.

However, in the gas turbine in Japanese Unexamined Patent Application, First Publication No. 2011-38491, as high-temperature gas flows into a gap between adjacent blade rings, a high-temperature oxidation reaction is triggered in the blade ring around the supporting member, and the thickness of the blade ring may decrease.

The present invention has been made in consideration of such circumstances, and an object thereof is to provide a repairing method of a gas turbine and a gas turbine that can suppress reduction in the thickness of a blade ring.

SUMMARY OF THE INVENTION

A gas turbine according to a first aspect of the present invention includes: a heat-resistant portion surrounding a channel for high-temperature gas from an outer peripheral side; an annular member formed in an annular shape on the outer peripheral side of the heat-resistant portion; and a supporting member fitted into a fitting concave portion recessed from an axial end face of the annular member, and supporting the heat-resistant portions. The fitting concave portion has, on an inner wall surface, a first inclined surface that inclines so as to narrow gradually from an opening edge thereof toward an axial inside of the annular member, and the supporting member has a second inclined surface that inclines so as to correspond to the first inclined surface.

According to the first aspect of the gas turbine, a gap is not formed between the first inclined surface in the fitting concave portion and the second inclined surface in the supporting member, and the second inclined surface abuts on the first inclined surface, whereby inflow of the high-temperature gas into this gap is suppressed. Accordingly, since the high-temperature gas does not stagnate in this gap and its periphery, a high-temperature oxidation reaction of the annular member can be reduced and reduction in the thickness of the annular member can be prevented. Additionally, if the supporting member includes a heat resistance material, the high-temperature oxidation reaction that acts on the supporting member itself is also reduced.

Moreover, according to a second aspect of the gas turbine related to the present invention, oxidation-resistant coating may be attached to the first inclined surface.

According to the second aspect of the gas turbine, the oxidation-resistant coating can reduce occurrence of a high-temperature oxidation reaction on the first inclined surface due to contact with the high-temperature gas, and can suppress reduction in the thickness of the annular member in the first inclined surface.

Additionally, a repairing method of a gas turbine according to a third aspect of the present invention includes: a heat-resistant portion surrounding a channel for high-temperature gas from an outer peripheral side; an annular member formed in an annular shape on the outer peripheral side of the heat-resistant portions; and a conventional supporting members fitted into fitting concave portions recessed from an axial end faces of the annular member, and supporting the heat-resistant portions. The repairing method includes: a parts removal step of removing the conventional supporting member; an outline forming step of forming, in an inner wall surface of the fitting concave portion, a first inclined surface that inclines so as to narrow gradually from an opening edge of the fitting concave portion toward an axial inside of the annular member; and a parts installation step of installing a supporting member, having a second inclined surface that inclines so as to correspond to the first inclined surface, in the fitting concave portion instead of the conventional supporting member.

According to the third aspect of the repairing method of a gas turbine, by replacing the conventional supporting member with the supporting member, the second inclined surface is abutted on the first inclined surface without a gap, so that inflow of the high-temperature gas into the gap between the annular member and the supporting member can be suppressed. Accordingly, since the high-temperature gas does not stagnate in this gap and its periphery, a high-temperature oxidation reaction of the annular member can be reduced and reduction in the thickness of the annular member can be prevented.

Moreover, the repairing method of a gas turbine according to a fourth aspect of the present invention may further include a coating step of attaching oxidation-resistant coating to the first inclined surface after the outline forming step is performed.

According to the fourth aspect of the repairing method of the gas turbine, as oxidation-resistant coating is attached to the first inclined surface, it is possible to reduce the high-temperature oxidation reaction of the first inclined surface due to contact with the high-temperature gas as described above. As a result, reduction in the thickness of the annular member in this first inclined surface can be suppressed.

DETAILED DESCRIPTION OF THE INVENTION

A gas turbine 1 related to a first embodiment of the present invention will be described below.

Figure 1:
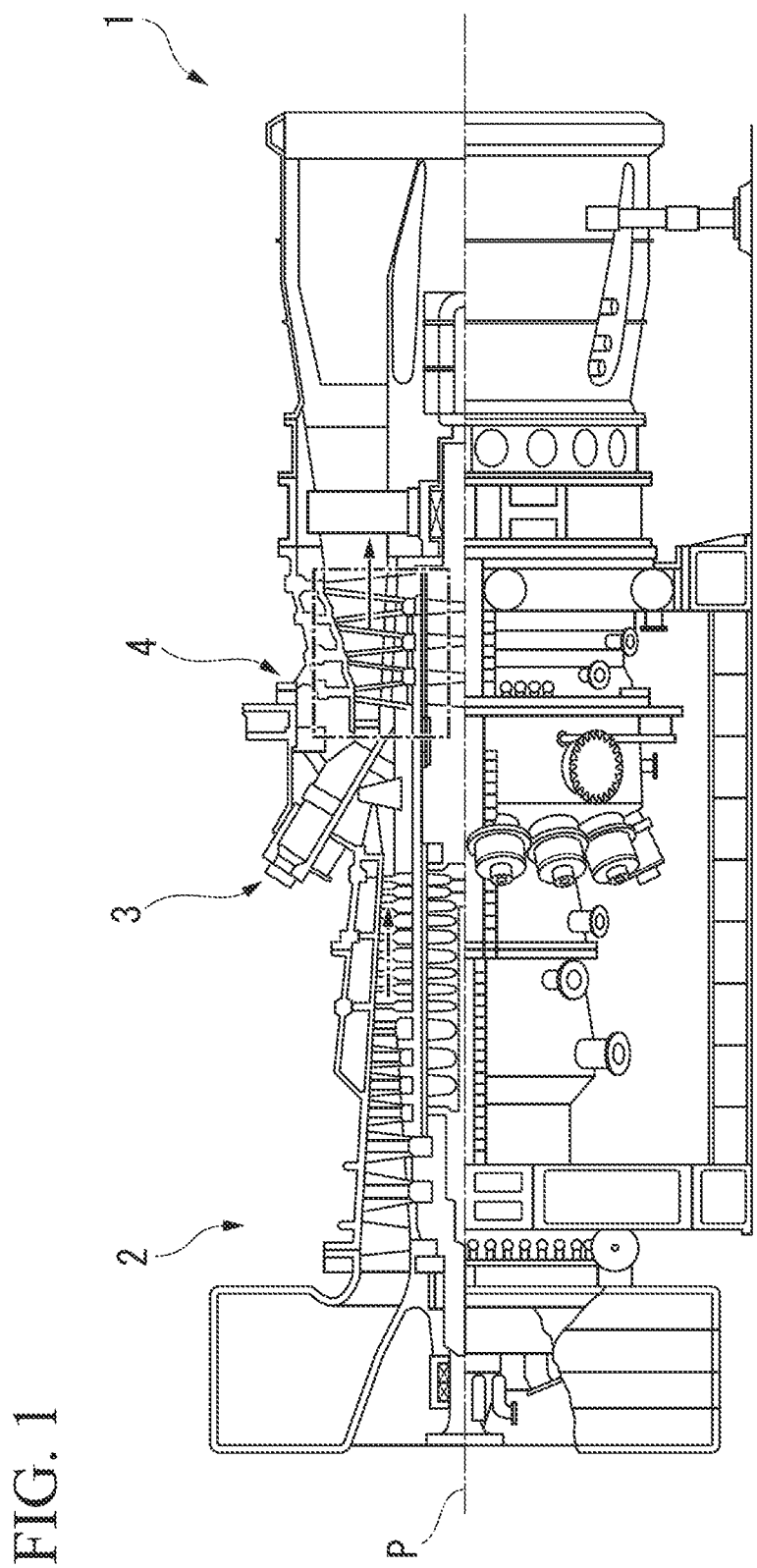
FIG. 1 is a half-cross-sectional view showing the schematic configuration of a gas turbine related to a first embodiment of the present invention.

As shown in FIG. 1, in the gas turbine 1, a combustor 3 mixes compressed air generated in a compressor 2 with fuel, and then burns the compressed air to generate high-temperature gas W. By making the high-temperature gas W flow into an axial-flow turbine 4 (hereinafter simply referred to as a turbine 4), the turbine 4 is rotated around an axis P to obtain rotative power. Also, the turbine 4 is connected to, for example, a generator (not shown) where power generation can be performed by converting the rotative power obtained from the gas turbine 1 into electricity.

Hereinafter, the compressor 2 side (left side of FIG. 1) of the gas turbine 1 is referred to as the upstream side in the direction of the axis P, and the turbine 4 side (right side of FIG. 1) is referred to as the downstream side in the direction of the axis P.

Figure 2:
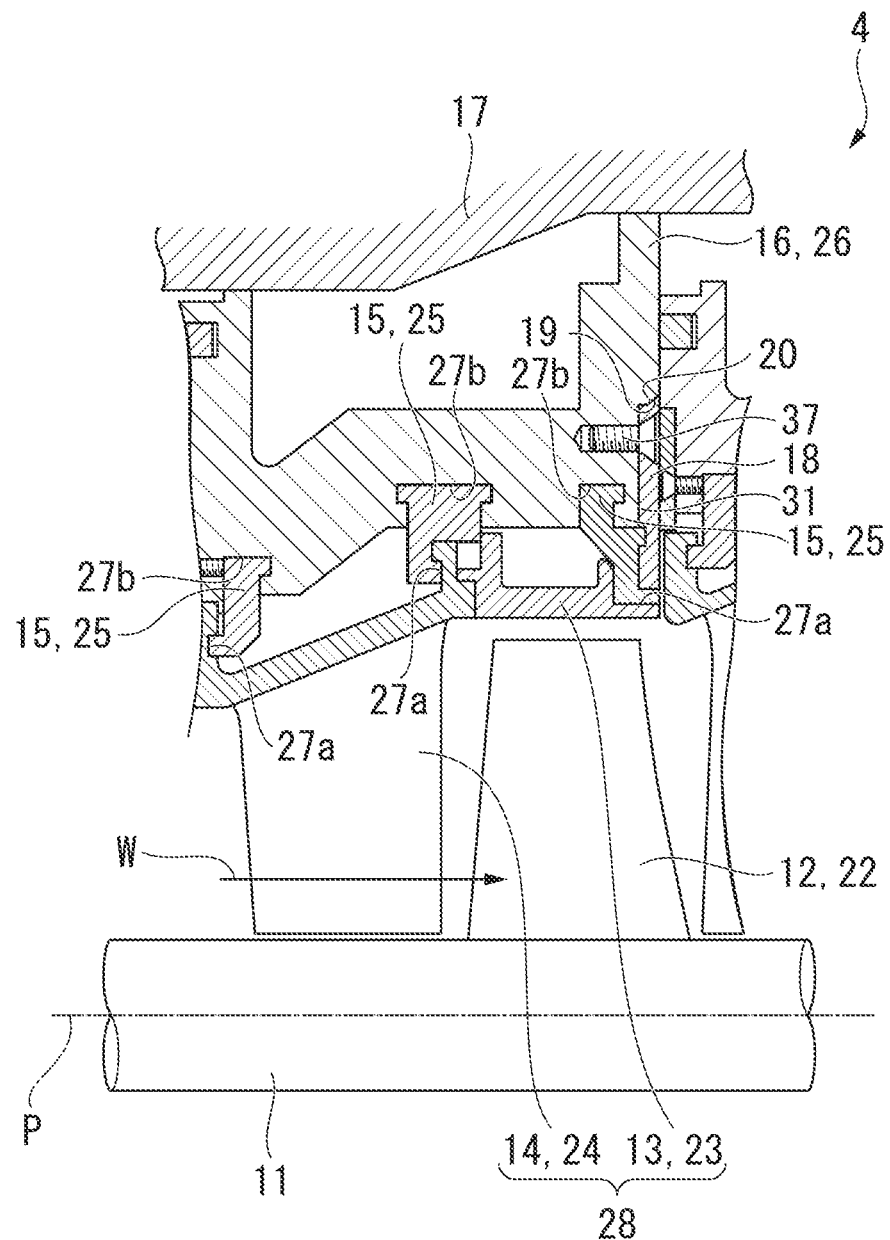
FIG. 2 is a cross-sectional view showing chief parts of a turbine in the gas turbine related to the first embodiment of the present invention in an enlarged and simplified manner.
Figure 3:
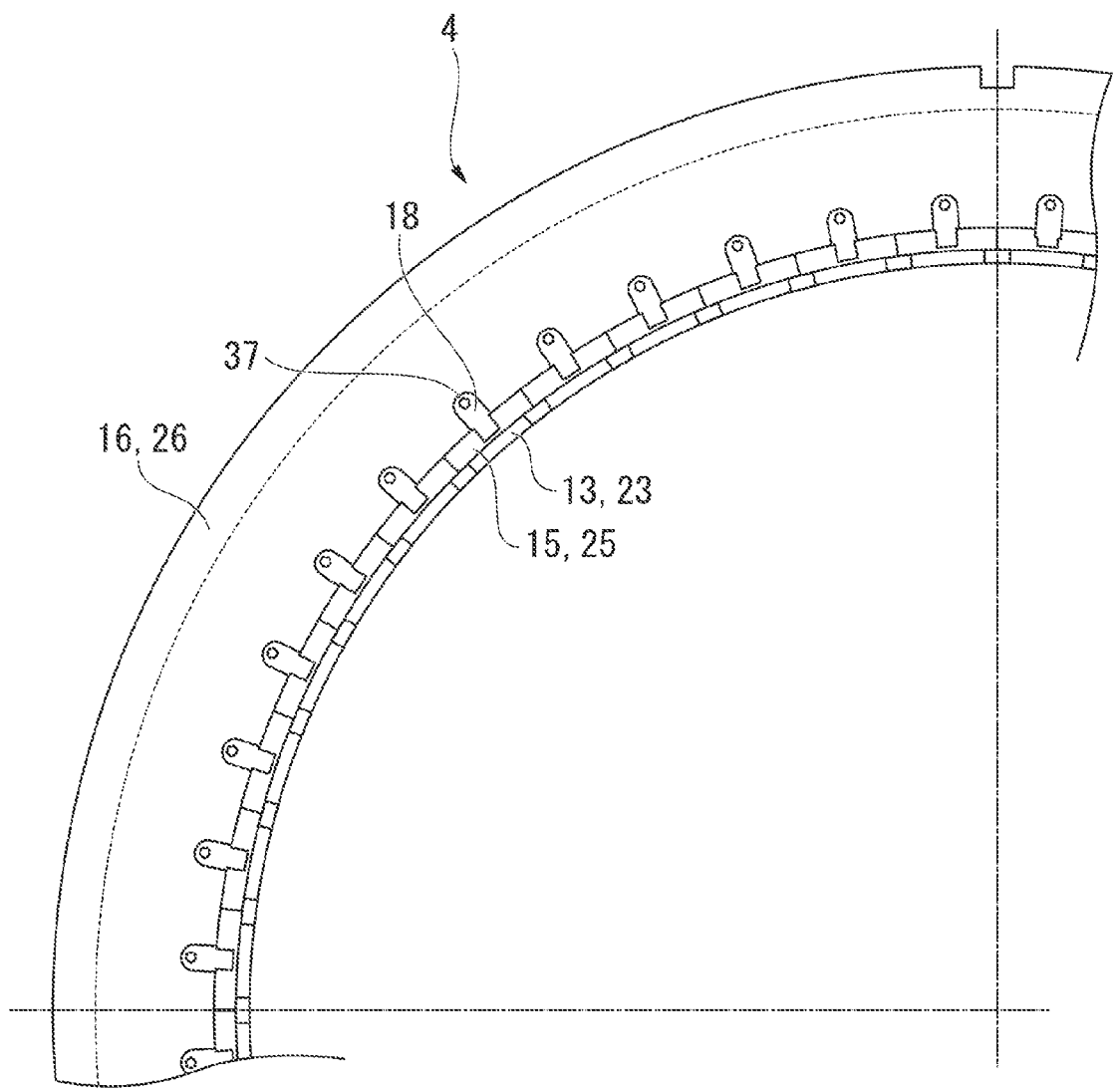
FIG. 3 is a view when the chief parts of the turbine in the gas turbine related to the first embodiment of the present invention are seen from an axial end face of a blade ring.

As shown in FIG. 2, the turbine 4 includes: a rotor 11 that is rotatable about the axis P; a plurality of blades 12 provided on the outer peripheral surface of the rotor 11; ring segments (heat-resistant portions) 13 installed on the outer peripheral side of the blades 12, that is, radially outside the blades; blade rings (annular member) 16 provided radially outside the ring segments 13 via isolation rings (heat-resistant portions) 15; and a casing 17 provided radially outside the blade rings 16.

Moreover, the turbine 4 includes fitting concave portions 31 that are recessed from the end faces of the blade rings 16 that face the downstream side in the direction of the axis P, and supporting members 18 that are fitted into the fitting concave portions 31 and support the isolation rings 15.

The rotor 11 is a shaft-shaped member that extends in the direction of the axis P and rotates about the axis P. Hereinafter, the rotational direction of the rotor 11 is referred to as a circumferential direction.

The plurality of blades 12 is provided at intervals in the direction of the axis P and in the circumferential direction, radially outward on the outer peripheral surface of the rotor 11. That is, a blade row 22 is formed by the blades 12 that are adjacent to each other in the circumferential direction. The blade rows 22 are arranged at intervals in the direction of the axis P, and are configured so as to rotate about the axis P together with the rotor 11.

The plurality of ring segments 13 is split in the circumferential direction. In the present embodiment, forty-eight ring segments 13 are provided in the circumferential direction, and are annularly formed by connecting the ring segments 13 that are adjacent to each other in the circumferential direction using a sealing member (not shown). This forms a ring segment row 23. Also, ring segment rows 23 that are adjacent to each other in the direction of the axis P are provided at the same intervals as the intervals of the blade rows 22 along the direction of the axis P. Moreover, the faces of the ring segments 13 that face inward in the radial direction are opposed, through a clearance, to the end faces of the blades 12 that face outward in the radial direction.

A plurality of vanes 14 is connected with the upstream end faces of the ring segments 13 in the direction of the axis P. The vanes 14 are arranged at intervals in the circumferential direction between the ring segment rows 23. Additionally, a vane row 24 is formed by vanes 14 that are adjacent to each other in the circumferential direction. Accordingly, a vane unit row 28 is formed by connecting one ring segment row 23 and the vane row 24, and the vane unit rows 28 and the blade rows 22 are arranged so as to be alternately aligned in the direction of the axis P.

The plurality of isolation rings 15 is members that are split in the circumferential direction. In the present embodiment, forty-eight isolation rings 15 are provided in the circumferential direction, and the isolation rings 15 that are adjacent to each other in the circumferential direction are connected to each other using a sealing member (not shown). Thereby, an isolation ring row 25 is formed in an annular shape.

Additionally, the isolation ring row 25 is annularly provided on the radially outside of the vane unit row 28, that is, surrounds the outer peripheral side of the vane unit row 28. A plurality of fitting portions 27a is provided on the face of the vane unit row 28 that faces outward in the radial direction. As respective radial inside portions of the isolation rings 15 in the isolation ring row 25 fit into the plurality of fitting portions 27a, the isolation ring row 25 is fixed to the ring segment row 23. The plurality of fitting portions 27a is provided in three places of the upstream side, the downstream side, and a central portion (a joint portion between the vanes 14 and the ring segments 13) in the direction of the axis P, in the face of the vane unit row 28 that faces outward in the radial direction in every vane unit row 28. As this allows three isolation ring rows 25 to fit to one vane unit row 28, the isolation ring rows 25 and the vane unit row 28 are connected to each other.

The blade rings 16 are members that are formed in an annular shape so as to surround the further outer peripheral side of the isolation ring row 25. As a blade ring row 26 is formed by the blade rings 16 that are adjacent to each other in the circumferential direction, and a plurality of the blade ring rows 26 is arranged adjacent to each other so as to be continuous in the direction of the axis P, the blade rings 16 are formed in a tubular shape. A plurality of fitting portions 27b is formed in three places of the upstream side, the downstream side, and the central portion in the direction of the axis P so as to correspond to the fitting portions 27a in every blade ring row 26, in the faces of the blade rings 16 that face inward in the radial direction. As the radial outside portion of the isolation ring row 25 is fitted into the fitting portions 27b, the blade rings 16 and the isolation rings 15 are fixed together.

The casing 17 forms the outline of the turbine 4 so as to surround the blade rings 16 from the further outer peripheral side. Additionally, as the radial inside of the casing 17 and the radial outside of the blade rings 16 are connected to each other, the blade rings 16 are supported radially inside the casing.

Next, the fitting concave portion 31 and the supporting member 18 will be described.

As shown in FIGS. 2, 3, and 4A to 4C, the fitting concave portion 31 is formed from the end face of the blade ring 16 that faces the downstream side in the direction of the axis P so as to be recessed toward the upstream side in the direction of the axis P. When an inner wall surface of the fitting concave portion 31 is seen from the downstream side in the direction of the axis P, a radial outside portion of the inner wall surface of the fitting concave portion 31 is semicircular, and a radial inside portion thereof has a rectangular shape in which the longitudinal direction is the radial direction. Additionally, the inner wall surface of the fitting concave portion 31 is a first inclined surface 19 that inclines so as to narrow gradually from an opening edge 33 toward the downstream side in the direction of the axis P. The first inclined surface 19 is formed to a middle portion between the end face of the blade ring 16 that faces the downstream side in the direction of the axis P and the bottom face of the fitting concave portion 31 that faces the downstream side in the direction of the axis P.

A bolt hole 34 is formed toward the downstream side in the direction of the axis P from the bottom face that faces the upstream side in the direction of the axis P in the radial outside portion of the fitting concave portion 31, and an inner peripheral surface of the bolt hole 34 is formed with a female thread portion 35.

Additionally, a corner portion formed between the end face of the blade ring 16 that faces the downstream side in the direction of the axis P and the end face that faces inward in the radial direction, and the opening edge 33 of the fitting concave portion 31 are chamfered to form a chamfer 32.

The supporting member 18 is formed in such a shape so as to be exactly fitted into the fitting concave portion 31 by a heat resistance material. Additionally, the supporting member 18 has a second inclined surface 20 that abuts on the first inclined surface 19 without a gap, in correspondence with the first inclined surface 19. Additionally, the supporting member 18 is formed so that, when the supporting member 18 is fitted into the fitting concave portion 31, the end faces of the blade ring 16 and the supporting member 18 that face the downstream side in the direction of the axis P are located on the same plane.

The end face of the supporting member 18 that faces the downstream side in the direction of the axis P is formed with a bolt hole 36 that is located radially outside. As a bolt 37 is inserted into the bolt hole 36 in the supporting member 18 and the bolt hole 34 in the fitting concave portion 31, and the bolt 37 is screwed to the female thread portion 35, the supporting member 18 is fixed to the fitting concave portion 31, that is, the blade ring 16.

Additionally, a radial inside portion of the face of the supporting member 18 that faces the upstream side in the direction of the axis P is formed with a concave portion 38. The respective isolation rings 15 constitute the isolation ring row 25 connected with the downstream side of the blade ring row 26 in the direction of the axis P. In the isolation ring 15, a radial inside portion of the face of the isolation ring 15 that faces the upstream side in the direction of the axis P is formed with a convex portion 39. As the convex portions 39 are fitted into the concave portions 38, the supporting members 18 and the isolation rings 15 are fixed, and the supporting members 18 regulate movement of the isolation rings 15 in the circumferential direction and the direction of the axis P.

Figure 4A:
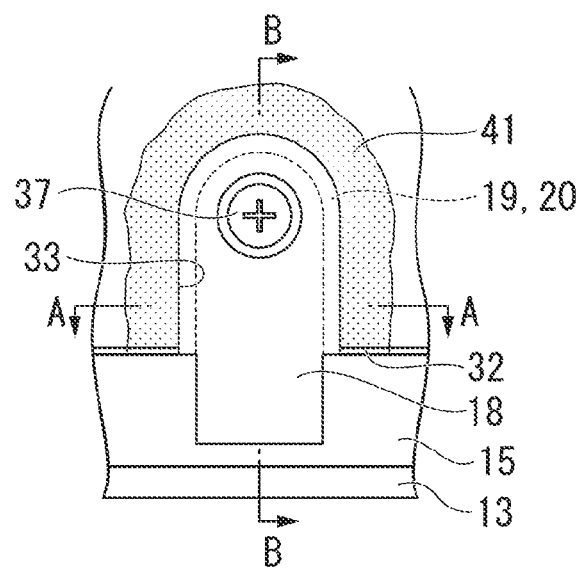
FIG. 4A is a view showing a supporting member and a fitting concave portion in the gas turbine related to the first embodiment of the present invention.
Figure 4B:
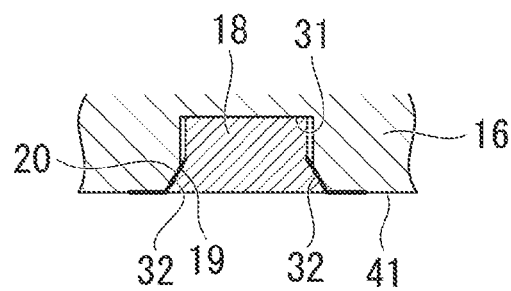
FIG. 4B is an A-A cross-sectional view of FIG. 4A.
Figure 4C:
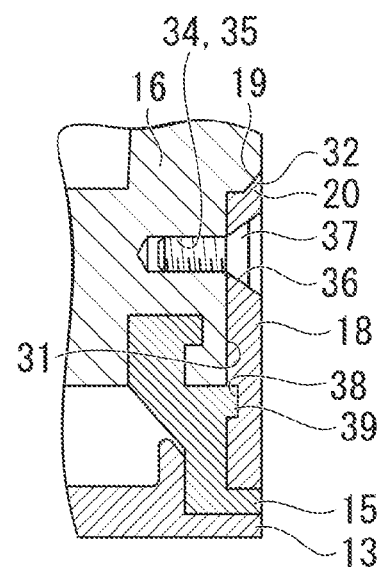
FIG. 4C is a B-B cross-sectional view of FIG. 4A.

Moreover, as shown in FIGS. 4A to 4C, oxidation-resistant coatings 41, such as CoNiCrAlY, are formed by metal spraying on the first inclined surface 19 and the end face of the blade ring 16 that faces the downstream side in the direction of the axis P, around the first inclined surface 19.

According to the gas turbine 1 as above, high-temperature gas W flows from the upstream side in the direction of the axis P toward the downstream side within the turbine 4 in operation. As the high-temperature gas W tends to flow from a high-pressure portion to a low-pressure portion within the turbine 4, or collides with the vanes 14, the high-temperature gas is entrained into a gap between the blade ring rows 26 that are adjacent to each other in the direction of the axis P, that is, the end faces of the blade ring rows 26 on the downstream side in the direction of the axis P.

In this case, as the first inclined surface 19 formed in the fitting concave portion 31 of the blade ring 16 and the second inclined surface 20 formed in the supporting member 18 are fitted to each other in close contact, entering of the high-temperature gas W to the gap between the fitting concave portion 31 and the supporting member 18 is suppressed. Moreover, as the end face of the blade ring 16 that faces the upstream side in the direction of the axis P and the end face of the supporting member 18 that faces the upstream side in the direction of the axis P are located on the same plane, retention of the high-temperature gas W can be avoided. Accordingly, a high-temperature oxidation reaction can be suppressed around the supporting member 18, and reduction in the thickness of the blade ring 16 can be suppressed.

Here, if the first inclined surface 19 and the second inclined surface 20 are not formed, and the supporting member 18 is fitted into the fitting concave portion 31, in order to eliminate the gap between the fitting concave portion 31 and the supporting member 18, high machining accuracy of the fitting concave portion 31 and the supporting member 18 is required. In this respect, in the gas turbine 1 of the present embodiment, the supporting member 18 can be easily fitted into the fitting concave portion 31 so as not to provide a gap, by making the first inclined surface 19 and the second inclined surface 20 abut on each other.

Additionally, by virtue of the oxidation-resistant coating 41 formed on the surface of the first inclined surface 19 of the blade ring 16 and its periphery, the surface of the blade ring 16 can be protected from the high-temperature gas W, a high-temperature oxidation reaction can be reduced, and reduction in the thickness of the blade ring 16 can be suppressed.

Moreover, as the chamfer 32 is chamfered, unevenness of spraying can be avoided and occurrence of a high-temperature oxidation reaction can be reduced, when coating metal for the oxidation-resistant coating 41 is sprayed. Moreover, since the supporting member 18 is made of a heat-resisting material, it is also possible to prevent the high-temperature oxidation reaction of the supporting member 18 itself.

Here, generally, the metal spraying is a surface treatment method of forming a coating on a surface of a workpiece by heating a metal which serves as a spraying material and spraying it onto the workpiece. The method has features that it is easy and takes short time to apply, and materials other than metal such as ceramics or plastics can also be used as the spraying material.

Additionally, if the chamfer 32 is not chamfered and is in a state where corners are left, heat is likely to be retained because the chamfer 32 is heated from two faces. For this reason, there is a possibility that occurrence of a high-temperature oxidation reaction may also be increased. In this respect, according to the gas turbine 1 of the present embodiment, heat retention can be avoided through chamfering and a high-temperature oxidation reaction can be reduced.

In the gas turbine 1 related to the present embodiment, the supporting member 18 is fitted into the fitting concave portion 31 without providing a gap, whereby entering of the high-temperature gas W to the fitting concave portion 31 is suppressed. Additionally, as the oxidation-resistant coating 41 is attached to the surface of the first inclined surface 19 and the blade ring 16 around the fitting concave portion 31, a high-temperature oxidation reaction triggered by the high-temperature gas W can be reduced, and as a result, reduction in the thickness of the blade ring 16 can be suppressed.

Next, a repairing method of a gas turbine 1 of a second embodiment will be described with reference to FIGS. 5A to 5C, and 6. The same constituent elements as those of the first embodiment will be designated by the same reference numerals, and the detailed description thereof will be omitted.

The gas turbine 1 to be repaired in the present embodiment is different from that of the first embodiment in that the fitting concave portion 31 is substituted with a conventional fitting concave portion 31A, in that the supporting member 18 is substituted with a conventional supporting member 18A, and in that the chamfer 32 of the blade ring 16 is not formed.

Figure 5A:
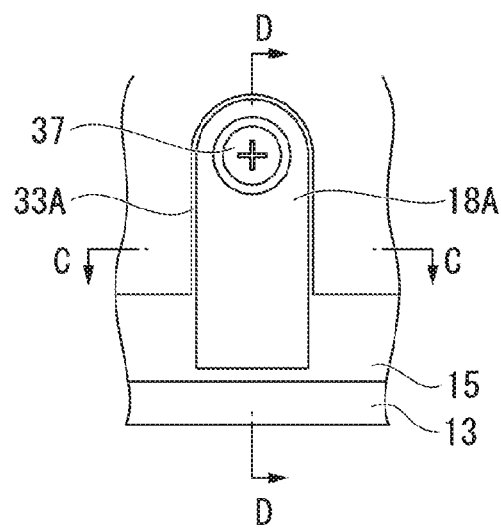
FIG. 5A is a view showing a conventional supporting member and a conventional fitting concave portion in a gas turbine related to a second embodiment of the present invention.
Figure 5B:
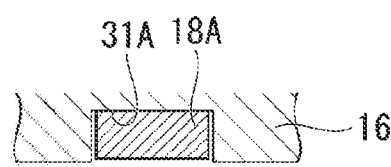
FIG. 5B is a C-C cross-sectional view of FIG. 5A.
Figure 5C:
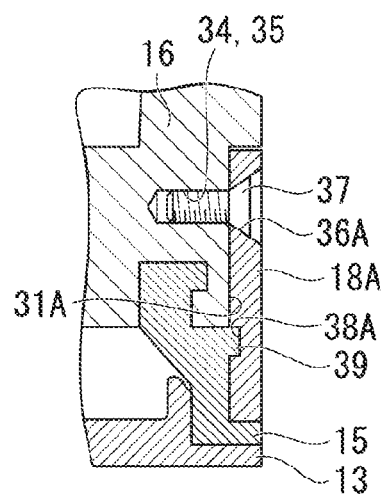
FIG. 5C is a D-D cross-sectional view of FIG. 5A.

As shown in FIGS. 5A to 5C, the conventional fitting concave portion 31A is formed from the end face of the blade ring 16 that faces the downstream side in the direction of the axis P so as to be recessed toward the upstream side in the direction of the axis P. When an inner wall surface of the conventional fitting concave portion 31A is seen from the downstream side in the direction of the axis P, a radial outside portion of the inner wall surface of the conventional fitting concave portion 31A is semicircular, and a radial inside portion thereof has a rectangular shape in which the longitudinal direction is the radial direction.

A bolt hole 34 is formed toward the downstream side in the direction of the axis P radially outside, in the bottom face of the conventional fitting concave portion 31A that faces the upstream side in the direction of the axis P. Additionally, an inner peripheral surface of the bolt hole 34 is formed with a female thread portion 35.

The conventional supporting member 18A is formed in such a shape that the supporting member is exactly fitted into the conventional fitting concave portion 31A, and the face of the supporting member that faces the downstream side in the direction of the axis P is formed with a bolt hole 36A that is located radially outside. A bolt 37 is inserted into the bolt hole 36A in the conventional supporting member 18A and the bolt hole 34 in the conventional fitting concave portion 31A, and the bolt 37 is screwed to the female thread portion 35. Thereby, the conventional supporting member 18A is fixed to the conventional fitting concave portion 31A, that is, the blade ring 16.

Additionally, a concave portion 38A formed in the face of the conventional supporting member 18A that faces the upstream side in the direction of the axis P is fitted to the convex portion 39 of the isolation ring 15, and the conventional supporting member 18A and the isolation ring 15 are fixed together.

When a high-temperature oxidation reaction due to the high-temperature gas W is triggered in the blade ring 16 around the conventional fitting concave portion 31A after a certain period of operation, the thickness of the blade ring 16 is reduced, and the gas turbine 1 is put into a state where repairing is required.

Next, a procedure of the repairing method of the gas turbine 1 will be described.

Figure 6:
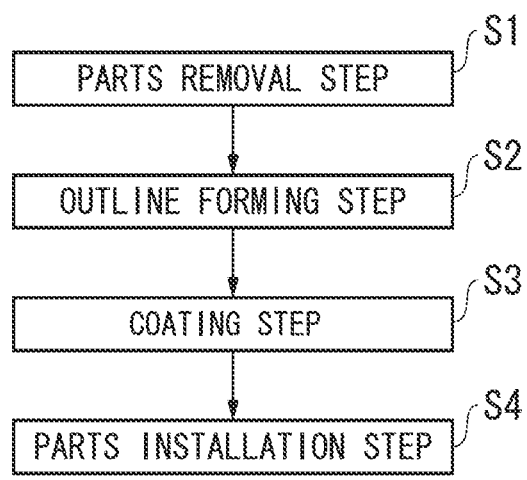
FIG. 6 is a flow drawing showing a repairing process of the gas turbine related to the second embodiment of the present invention.

FIG. 6 is a flowchart showing a repairing process of the gas turbine 1, and this repairing process includes a parts removal step S1, an outline forming step S2, a coating step S3, and a parts installation step S4.

First, the parts removal step S1 is performed. That is, the conventional supporting member 18A is removed from the blade ring 16 and the isolation ring 15 by removing the bolt 37.

Next, the outline forming step S2 is performed. That is, the first inclined surface 19 is formed by means of cutting work or the like after build-up welding is performed on a thin portion of an opening edge 33A of the conventional fitting concave portion 31A that has opened by the removal of the conventional supporting member 18A. Then, the first inclined surface 19 is formed by machining the inner wall surface of the conventional fitting concave portion 31A to a middle portion between the end face of the blade ring 16 that faces the downstream side in the direction of the axis P and the bottom face of the fitting concave portion 31A that faces the downstream side in the direction of the axis P so as to narrow gradually from the opening edge 33A toward the upstream side in the direction of the axis P. Thus, the fitting concave portion 31 is formed from the conventional fitting concave portion 31A.

Further, in the outline forming step S2, a corner portion formed between the end face of the blade ring 16 that faces the downstream side in the direction of the axis P and the end face that faces inward in the radial direction, and the opening edge 33A of the conventional fitting concave portion 31A are chamfered to form the chamfer 32.

Subsequently, the coating step S3 is performed. Metal spraying is performed on the first inclined surface 19 formed at the fitting concave portion 31 of the blade ring 16 and its periphery, and the oxidation-resistant coating 41 (CoNiCrAlY in the present embodiment) is formed on the surface.

The parts installation step S4 is performed as the final process. That is, the supporting member 18 having the second inclined surface 20 is separately manufactured, and the supporting member 18 is fitted into the fitting concave portion 31 so that the second inclined surface 20 abuts on the first inclined surface 19 without a gap. At this time, the end face of the blade ring 16 that faces the downstream side in the direction of the axis P and the end face of the supporting member 18 that faces the downstream side in the direction of the axis P are located on the same plane.

According to the repairing method of the gas turbines 1 as described above, the blade ring 16, of which the thickness has decreased after a certain period of operation due to the high-temperature gas W entrained into the end face of the blade ring row 26 on the downstream side in the direction of the axis P, is repaired by build-up welding, and the first inclined surface 19 is formed. For this reason, it is possible to replace the conventional supporting member 18A with the supporting member 18 having the second inclined surface 20. Accordingly, the first inclined surface 19 and the second inclined surface 20 can be made to abut on each other without a gap, entering of the high-temperature gas W to the gap between the fitting concave portion 31 and the supporting member 18 can be suppressed, and a high-temperature oxidation reaction can be reduced.

Moreover, retention of the high-temperature gas W can be avoided, as the end face of the blade ring 16 that faces the upstream side in the direction of the axis P and the end face of the supporting member 18 that faces the upstream side in the direction of the axis P are located on the same plane after the conventional supporting member 18A is replaced with the supporting member 18. Accordingly, the high-temperature oxidation reaction of the blade ring 16 around the supporting member 18 can be suppressed.

Additionally, as the chamfer 32 is formed, unevenness of spraying can be avoided and retention of heat can also be avoided, when coating metal for the oxidation-resistant coating 41 is sprayed. As a result, the high-temperature oxidation reaction can be reduced.

In the repairing method of the gas turbine 1 related to the present embodiment, the blade ring 16 that has been thinned due to a high-temperature oxidation reaction generated as the gas turbine 1 operates for a certain period of time can be repaired. Moreover, a high-temperature oxidation reaction after operation resumption can be reduced, and reduction in the thickness of the blade ring 16 can be suppressed.

Although the embodiments of the present invention have been described in detail, some design changes can also be made without departing from the technical idea of the present invention.

For example, the oxidation-resistant coating 41 to the first inclined surface 19 and its periphery is not necessarily performed. In this case, it is possible to reduce the number of manufacturing steps and the number of repairing steps.

Additionally, in the present embodiment, the supporting member 18 is provided at the end face that faces the upstream side in the direction of the axis P. However, the supporting member 18 may be provided at the end face that faces the downstream side in the direction of the axis P. Additionally, the supporting member 18 may support both the ring segment 13 and the isolation ring 15, or may support either. Thus, there are various patterns of the supporting member 18. Moreover, the shapes of the supporting member 18, the concave portion 38, and the convex portion 39 are also various.

While preferred embodiments of the present invention have been described and illustrated above, it should be understood that these are exemplary of the present invention and are not to be considered as limiting. Additions, omissions and substitutions, and other modifications can be made without departing from the scope of the present invention. Accordingly, the present invention is not to be considered as being limited by the foregoing description, and is only limited by the scope of the appended claims.

What is claimed is:

1. A gas turbine comprising:
a heat-resistant portion surrounding a channel for high-temperature gas from an outer peripheral side;
an annular member formed in an annular shape on the outer peripheral side of the heat-resistant portion; and
a supporting member fitted into a fitting concave portion which has a bottom face facing a downstream side in the high-temperature gas flow direction along an axis of the annular member, recessed from an axial end face of the annular member along the axis, and supporting the heat-resistant portion, wherein
the fitting concave portion has a first inclined surface that inclines so as to narrow gradually from an opening edge thereof toward an upstream side in the high-temperature gas flow direction along the axis, and
the supporting member has a second inclined surface that inclines so as to come into contact with the first inclined surface,
the supporting member comes into contact with the bottom face of the fitting concave portion and is formed in a shape which fits into the fitting concave portion,
the supporting member is formed so that, when the supporting member is fitted into the fitting concave portion, the axial end face of the annular member and an axial end face of the supporting member that face the downstream side are located on the same plane,
a bolt hole with a female thread portion is formed toward the upstream side in the direction of the axis from the bottom face in the fitting concave portion,
a radial outside portion of the supporting member has a semicircular shape,
a radial inside portion of the supporting member has a rectangular shape in which the longitudinal direction is the radial direction,
a bolt hole is provided in the supporting member, and
a bolt is inserted into the bolt hole, is screwed into the female thread portion, and fixes the position of the supporting member.

2. The gas turbine according to claim 1,
wherein oxidation-resistant coating is attached to the first inclined surface.

3. The gas turbine according to claim 1, wherein
the first inclined surface is formed to a middle portion between the axial end face of the annular member and the bottom face that faces the downstream side of the fitting concave portion.

4. A repairing method of a gas turbine including:
a heat-resistant portion surrounding a channel for high-temperature gas from an outer peripheral side;
an annular member formed in an annular shape on the outer peripheral side of the heat-resistant portion; and
a first supporting member fitted into a fitting concave portion which has a bottom face facing a downstream side in the high-temperature gas flow direction along an axis of the annular member, recessed from an axial end face of the annular member along the axis, and the first supporting member supports the heat-resistant portion,
the repairing method comprising:
a parts removal step of removing the first supporting member;
an outline forming step of forming, in an inner wall surface of the fitting concave portion, a first inclined surface that inclines so as to narrow gradually from an opening edge of the fitting concave portion toward an upstream side in the high-temperature gas flow direction along the axis; and
a parts installation step of installing a second supporting member, having a second inclined surface that inclines so as to come into contact with the first inclined surface, in the fitting concave portion instead of the first supporting member, coming into contact with the bottom face of the fitting concave portion, being formed in a shape which fits into the fitting concave portion, and being formed so that, when the supporting member is fitted into the fitting concave portion, the axial end face of the annular member and an axial end face of the supporting member that face the downstream side are located on the same plane, wherein a bolt hole with a female thread portion is formed toward the upstream side from the bottom face in the fitting concave portion, a radial outside portion of the supporting member has a semicircular shape, a radial inside portion of the supporting member has a rectangular shape in which the longitudinal direction is the radial direction, a bolt hole is provided in the supporting member, and a bolt is inserted into the bolt hole, is screwed into the female thread portion, and fixes the position of the supporting member.

5. The repairing method of a gas turbine according to claim 4, further comprising a coating step of attaching oxidation-resistant coating to the first inclined surface after the outline forming step is performed.

6. The repairing method of a gas turbine according to claim 4, wherein in the outline forming step which is forming the first inclined surface, the first inclined surface is formed to a middle portion between the axial end face of the annular member and the bottom face that faces the downstream side of the fitting concave portion.

* * * * *